Dec. 5, 1939.  J. S. REID  2,182,389

METHOD AND MEANS FOR MOLDING THERMOPLASTIC ARTICLES

Filed April 29, 1937  2 Sheets-Sheet 1

INVENTOR.
JAMES S. REID

BY

ATTORNEY.

Dec. 5, 1939.  J. S. REID  2,182,389

METHOD AND MEANS FOR MOLDING THERMOPLASTIC ARTICLES

Filed April 29, 1937  2 Sheets-Sheet 2

INVENTOR.
JAMES S. REID
BY
John H. Leonard
ATTORNEY.

Patented Dec. 5, 1939

2,182,389

UNITED STATES PATENT OFFICE

2,182,389

METHOD AND MEANS FOR MOLDING THERMOPLASTIC ARTICLES

James S. Reid, Shaker Heights, Ohio, assignor, by mesne assignments, to The Standard Products Company, Port Clinton, Ohio, a corporation of Ohio Application April 29, 1937, Serial No. 139,774

6 Claims. (Cl. 18—42)

This invention relates generally to an improvement in injection molding of plastic materials, such as thermoplastic and thermo-setting materials, and is directed more specifically to a method and means for controlling the position of the weld zone and for improving the quality of the surface at the weld line or zone of articles formed or coated with such materials in regard to appearance and strength, whereby consistently satisfactory results are obtained and assured.

In the art of molding thermoplastic articles by injection, it is well known that as the material is forced into the mold cavity of a gate, it divides into a number of streams flowing in and around the cavity. These streams eventually converge in another portion in the cavity and thereby produce a weld line or zone which is objectionable both as to appearance and strength. This is particularly true in the molding of relatively large articles in mold cavities maintained at a substantially constant temperature and in molding of relatively thin coatings of material on cores or inserts.

From the standpoint of appearance, these weld lines are objectionable because of the apparent cracks or scratches resulting from the meeting in the mold cavity of the streams of injected material.

In regard to strength, such a weld line is the weakest point on the entire surface of the article because the leading edges of the streams of material which must form the weld are the first to enter the cavity and, accordingly, are the least plastic. Consequently, even with an extremely heavy injection pressure applied on the material, the meeting zones of these streams of material do not merge and produce a homogeneous weld with each other.

The principal object of the present invention, therefore, is to provide a method and means for causing the approaching edges of the streams of material to thoroughly merge into each other and form a homogeneous weld and thereby provide a smooth, uniform surface over the entire area of the article and also to assure that the strength of the article or coating is uniform through the entire mass of the article.

Another object of the invention is to constrain the streams of material to meet and weld in predetermined zones in the mold cavity by subjecting the material to thermal differentials at different portions.

Another object is to provide a new and improved means for controlling the temperatures of different zones of the mold.

A more specific object is to provide a means for causing the streams of material to merge by applying heat to the walls of the cavity at the zone of confluence of the streams of material.

Other objects will become apparent from consideration of the following specification taken in conjunction with the accompanying drawings, in which.

For purposes of illustration, the invention is shown in conjunction with the molding of an automobile steering wheel and a water faucet handle, it being readily apparent therefrom that the principle embodied is equally applicable to the formation of many other articles.

Figure 1:
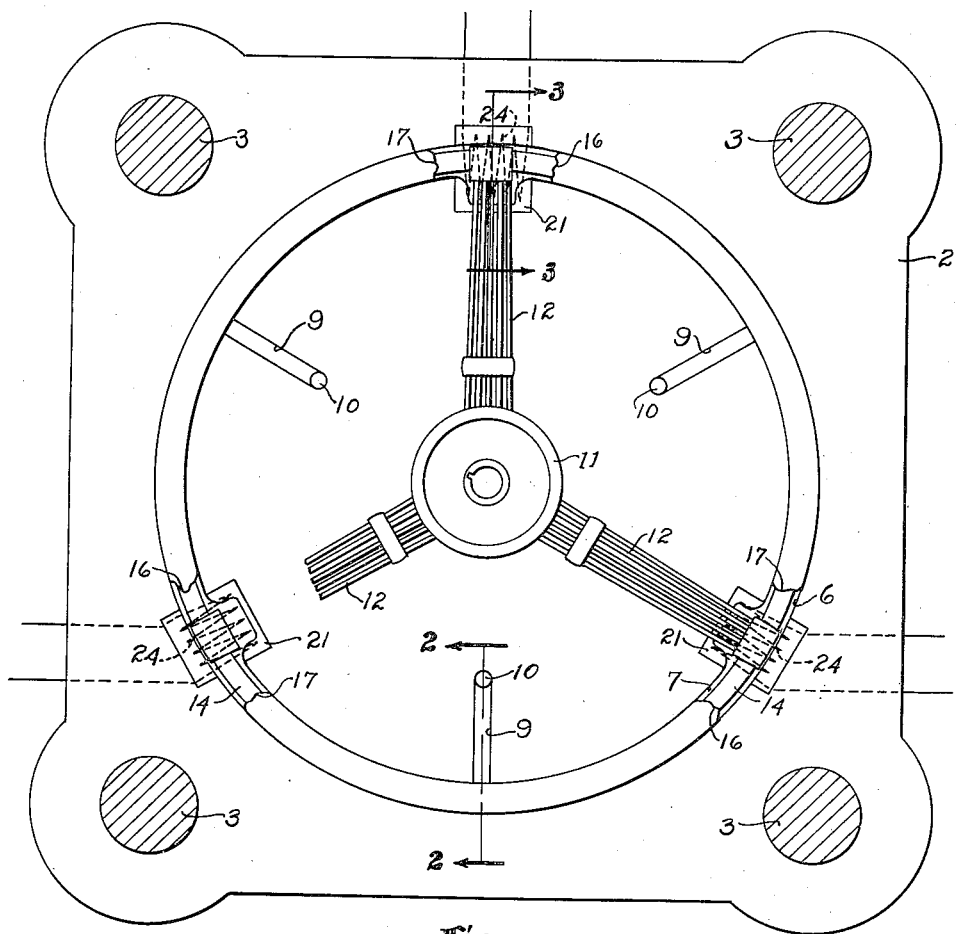
Fig. 1 is a plan view of one section of a mold for coating steering wheel spiders and embodying the present invention.
Figure 2:
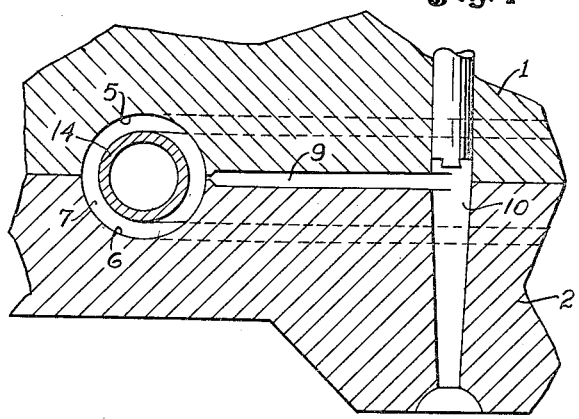
Fig. 2 is an enlarged fragmentary sectional view taken substantially along a plane indicated by the line 2—2 in Fig. 1.
Figure 3:
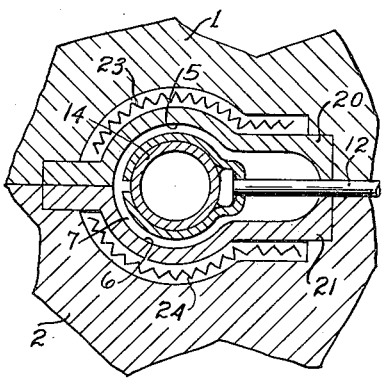
Fig. 3 is an enlarged fragmentary sectional view taken substantially on the line 3—3 of Fig. 1.

Referring to Figs. 1 to 3, inclusive, the mold is shown comprising separable mold sections 1 and 2 mounted for relative movement toward and away from each other on suitable guide rods 3. The sections 1 and 2 are provided with annular recesses 5 and 6, respectively, which define a mold cavity 7 when the mold sections are in abutting relation.

Leading to the cavity 7 are a number of gates 9 which are preferably positioned between the mold sections 1 and 2, each of which is connected to a suitable sprue passage 10. The mold sections are brought together and held in firm pressure engagement before the thermoplastic material is injected into the mold cavity.

For purposes of illustration, the molding of a coating on a steering wheel insert is shown in Figs. 1 to 3, the steering wheel spider which comprises a hub member 11, spokes 12, and an annular rim member 14 being disposed in the mold cavity. This rim member 14 may be positioned and held in uniform spaced relation from the walls of the cavity 7.

It will be noted that the steering wheel spider is positioned so that adjacent spokes lie on each side of one of the gates 9.

The thermoplastic material, in a plastic condition, enters the sprue passage 10 from a suitable pressure source, such as an injection cylinder, from which it flows through the gate 9 into the cavity 7. As the material enters the cavity, it first embraces or circumvents the cross section of the rim 14 so as to form a complete ring of material around the rim at the zone of each of the gates 9. Upon continued injection of more material into the cavity, the distance between ends 16 and 17 of the coating or sleeve of material increases longitudinally of the rim 14. This action occurs concurrently and with equal velocity at the zone of each gate 9. Thus the end 16, issuing from one of the gates 9, meets and contacts the end 17 from another adjacent gate. Since the pressure on the material and the velocity of flow of each of the ends 16 and 17 are substantially constant, it follows that the associated ends 16 and 17 contact each other in a predetermined zone on the rim annulus 14, usually midway between the gates. At this predetermined zone, heat is applied to the walls of the cavity so that the end portions 16 and 17 which have been lowered in temperature and become less plastic due to passage along a considerable portion of the mold cavity walls, and consequently may not weld properly, will be re-heated and rendered more plastic and therefore produce a homogeneous connection between the two approaching streams.

One exemplary means for concentrating the heat at these predetermined zones is disclosed in Figs. 1 to 3, wherein plates 20 and 21 are inlaid into the mold sections 1 and 2, respectively. These plates provide a continuation of the cavity 7 at the zone where the streams 16 and 17 meet. Suitable heating elements 23 and 24 are provided adjacent each of the plates 20 and 21, respectively, and in close proximity with the walls of the cavity 7. These heating elements are enclosed in an insulated section between the plate 20 and the mold section 1, and between the plate 21 and the mold section 2. Thus, when the heating elements are energized from a suitable source of electrical power, the heat produced by the resistance of the elements is transferred through the plates 20 and 21 to the walls of the cavity where the streams 16 and 17 of material meet.

These plates 20 and 21 may be removable from their associated mold sections, if desired, for the purpose of repairing the coils when reconditioning thereof becomes necessary.

The heat at these portions of the cavity is preferably maintained at a temperature sufficient merely to soften the material and not sufficient to cause the material to flow freely. These sections of the mold cavity are maintained at such a temperature in order to eliminate the necessity for changing the temperature during the molding cycle. It may be found desirable, however, to maintain the temperature at these zones sufficient to render the material substantially the same viscosity as the material entering the cavity at the gate. This would tend to facilitate the escape of any gas which might otherwise be trapped between the streams 16 and 17. The relatively softer material will prevent the gas from producing pock-marks on the surface of the article, forcing it out from the cavity between the parting surface of the mold sections.

This is consistent with the desire for high speed production for molding such articles as steering wheels and the like. This temperature may be controlled automatically by a suitable thermostat or other thermal-controlled device.

It is apparent that other heating means, such as steam or hot air, may be provided and properly controlled to accomplish the same purpose.

In this particular form, it will be seen that the zones where the streams of material 16 and 17 meet are the zones which are substantially equidistant from adjacent gates 9. The space between the cavity walls and the insert 14 is substantially uniform so that the resistance to flow of the material in this space is substantially uniform throughout the entire circumference of the rim. Therefore, these predetermined zones are the natural locations where the streams 16 and 17 meet and unite.

It may be found desirable to pre-heat the rims 14 of the steering wheel at the zone where the streams 16 and 17 meet and unite instead of providing the heating elements 24. The heat in these portions of the rim is preferably sufficient merely to soften the material and effect a smooth integral surface at the zone where the weld occurs.

Figure 4:
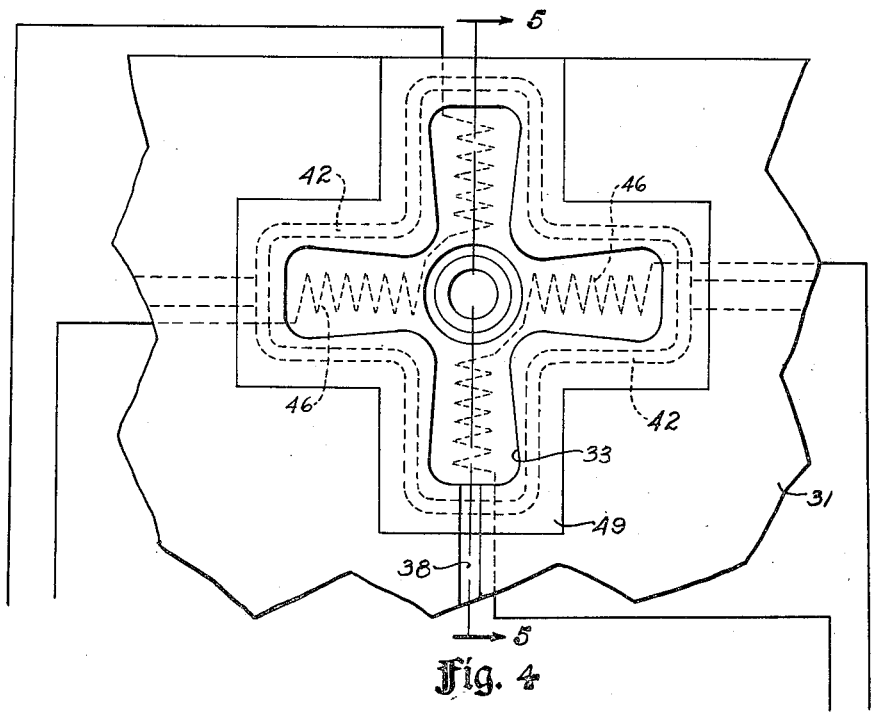
Fig. 4 is a fragmentary plan view of a mold for an article of hardware, such as a water faucet handle.
Figure 5:
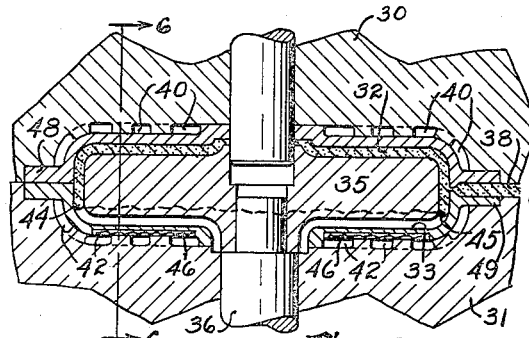
Fig. 5 is a fragmentary sectional view taken along the line 5—5 of Fig. 4.
Figure 6:
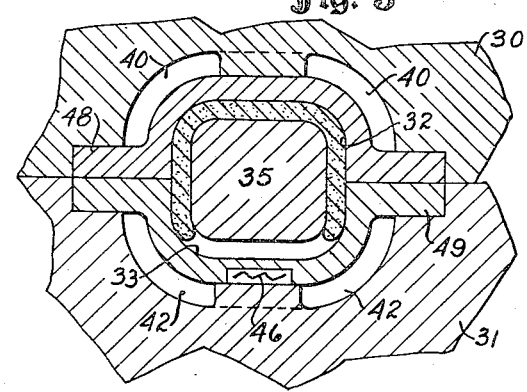
Fig. 6 is an enlarged fragmentary sectional view taken along the line 6—6 of Fig. 5.

Referring now to Figs. 4 to 6, inclusive, wherein a mold for the production of an article of hardware, such as a water faucet handle, is provided, this mold is shown comprising separable mold sections 30 and 31 having recesses 32 and 33, respectively, which, when the mold sections are in closed position, define a cavity. Positioned within the cavity and held in spaced relation from the walls thereof is a suitable insert 35. This insert is so held by means of a suitable pin 36 which prevents the insert from shifting in the cavity during the molding operation.

In this particular embodiment, the space between the cavity walls and the insert is preferably substantially uniform over the entire surface of the article. This space is connected by a gate 38 to a suitable source of heated and plastic material which is carried therethrough to the cavity by injection pressure. The material, upon entering the cavity, flows along the path of least resistance and consequently fills that portion of the cavity first. The more highly impeded portions of the cavity are the last to be filled.

This variation of impedance to flow of material may be controlled entirely by temperature such as shown and described in an application of Harry R. Husted, Serial No. 127,970, filed February 26, 1937. Like that application, the present embodiment provides a heated portion in the upper mold section 30 and adjacent the recess 32 and a relatively cooler portion in the lower section 31 adjacent the recess 33.

The heated portion of the cavity may be maintained at the desired temperature by passing steam or other thermal fluid through passages 40. It is also contemplated that suitable electrical heating means may be provided for accomplishing this purpose. The lower recess 33 may be maintained at a somewhat lower temperature than the upper recess 32 by passing a cooling medium such as water, for example, through passages 42.

Any suitable automatic or manual means may be provided for changing or controlling the temperatures in various portions of the mold cavity. It will be apparent, therefore, that by so governing the temperature of the cavity walls, the zone of the last portion of the cavity to be filled can be accurately and consistently predetermined.

As the material enters the cavity from the gate 38, it impinges against the insert 35 and divides into streams 44 and 45 as best shown in Fig. 5. The stream 44 follows the heated portion of the cavity, that is, the portion defined by the recess 32 and the adjacent surface of the insert 35. The temperature of this portion of the cavity maintains the material sufficiently plastic to allow the material to flow relatively freely therein. The stream 45, however, flows in the relatively cooler portion of the cavity, that is, between the insert 35 and the recess 33. In this portion of the cavity the material does not flow as freely as in the upper portion because of the relatively lower temperature of the walls of the recess 33 and the resultant sluggish character of the material. Consequently, the streams 44 and 45 of material eventually converge within reasonable limits in a predetermined zone in the relatively cool portion of the cavity.

The leading edges of the streams 44 and 45, being relatively cool after passing over the low temperature zone around the recess 33, do not readily form a strong smooth weld line even when extremly high injection pressures are employed. Therefore, in order to produce a strong, smooth weld line, the zone where the streams 44 and 45 are bound to meet is heated by an electrical heating element 46 to a temperature just sufficient to soften the leading edges of the material so that they will blend and merge together. In this manner, the streams unite to completely envelop the insert 35 in a coating of thermoplastic material. This heating element 46 is preferably insulated from heat transmission on all sides except the side adjacent the recess 33 so that the desired zone of the cavity may be maintained at the proper temperature without dissipating an undue quantity of heat therefrom into the cooling medium which is circulating in the passages 42.

To simplify the construction of such a mold, the recesses 32 and 33 may be provided in plates 48 and 49 which are inlaid in the surfaces of the mold sections 30 and 31, respectively, and secured thereto by screws or other suitable fastening means.

Figure 7:
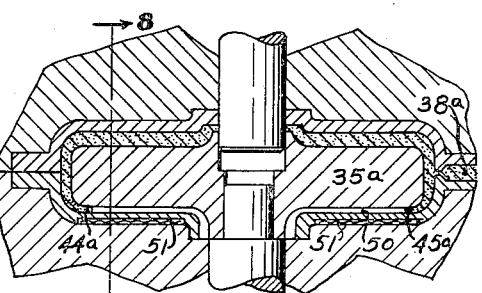
Fig. 7 is a view similar to Fig. 5, showing a modification of the application.
Figure 8:
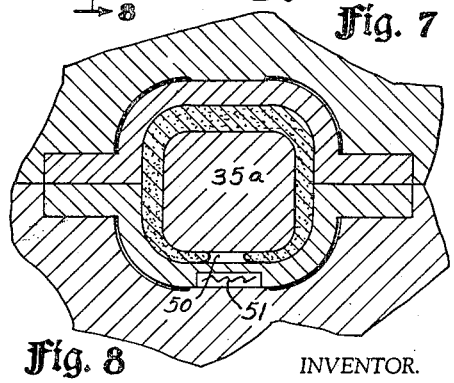
Fig. 8 is a view similar to Fig. 6 and taken substantially along the line 8—8 of Fig. 7.

Figs. 7 and 8 disclose a further modification of the invention wherein the insert 35ª is held in an eccentric position to the walls of a cavity 50 or otherwise disposed in the said cavity to provide a relatively restricted portion therein at a predetermined zone. Thus the material, upon being injected into the cavity through a gate 38ª, divides into streams 44ª and 45ª. The stream 44ª flows relatively freely in the larger portion of the cavity and the stream 45ª flows somewhat slower in the relatively restricted portion. The streams finally converge in the relatively restricted zone of the cavity to form a weld line.

The walls of the cavity 50 are preferably maintained at a temperature somewhat lower than the melting point of the material in order to chill and set the material as quickly as possible without changing the temperature of the mold. Thus, the leading edges of the streams 44ª and 45ª are relatively cool by the time they converge and unite in the predetermined zone of the restricted portion of the cavity 50. Therefore, in order to insure a positive integral union of the entire thermoplastic coating, these edges are heated at the zone of union by a suitable heating medium such as an electrical heating element 51 in the same manner as heretofore described.

It should be noted that to be consistent with the rapid production requirements of such articles, the various temperatures at different zones in the cavity are not allowed to change to any great extent throughout the molding cycle. For example, in the modification shown in Figs. 4 to 6, inclusive, the temperature of the cavity at the recess 32 is relatively high and is preferably maintained at this same temperature during the entire molding cycle. Concurrently, the temperature of the cavity defined by the recess 33 is maintained at a relatively lower degree throughout the cycle. This is likewise true at the zone which is heated by the element 46.

All of the above temperatures are held below the point where the material flows or runs of its own accord. The relatively higher temperatures are merely sufficient to effect the desired difference in the degree of plasticity to produce the desired results.

From the above description, it will be seen that a novel method and means has been disclosed for materially improving the quality of the surface of articles molded of thermoplastic material by the injection process by first causing a number of streams of material flowing under the influence of pressure in a cavity to meet at a predetermined zone and then providing at that zone a means for heating the leading edges of the streams sufficiently to cause the said edges to merge together and form a smooth strong bond.

For brevity and reduction in number of the claims, the term "thermal material" has been used to denote thermoplastic and thermo-setting materials.

Having thus described my invention, what I claim is:

1. The method of molding thermal plastic material by injection comprising injecting the material in plastic condition and under pressure into one portion of a mold cavity, causing the material initially to flow in a number of streams in the cavity and subsequently to meet and unite in a predetermined zone in the cavity, and applying higher temperature to the wall of the cavity at said zone than at other regions of the cavity to render the leading edges of the streams relatively more plastic at said predetermined zone than in other portions of the cavity, and meanwhile continuing the injection pressure on the material.

2. In the molding of an article of thermal material by injection, the method of producing a smooth, flush surface over the entire area of the article comprising injecting the material under pressure and while in a plastic condition, into a mold cavity having portions of predetermined temperature, causing the material to divide into a number of streams immediately upon entering the cavity, then subsequently causing confluence of the streams in a predetermined zone in the cavity, maintaining the injection pressure after confluence and meeting of said streams and concurrently maintaining a higher temperature in the mold cavity walls at the zone of confluence than the said predetermined temperature.

3. The method of covering the surface of a preformed article with thermoplastic material comprising placing the article in spaced relation from the walls of a mold cavity having relatively cool walls over a portion thereof, injecting the material in heated, plastic condition and under pressure into the space between the articles and the cavity walls, the material dividing into a number of streams flowing in the space and around the article, causing the streams of material to meet in a predetermined zone in the cavity, and heating the cavity wall at said predetermined zone to a relatively higher temperature while continuing the injection pressure on the material.

4. The method of covering the surface of a preformed article with thermal material comprising placing the article in spaced relation from the walls of a mold cavity, the cavity walls being maintained at a temperature below the plasticizing temperature of the material, injecting the material under pressure into one portion of the cavity at a temperature considerably above the plasticizing temperature, initially causing the material to diverge into streams which flow in different directions around the article and in the cavity, the leading edges of the streams being partially congealed from contact with the cavity walls, subsequently causing the relatively cool leading edges of the streams to converge and meet in a predetermined zone in the cavity, and maintaining the said zone at a temperature sufficient to slightly soften the said edges of the material while continuing the injection pressure whereby to cause the said leading edges to fuse and merge together as an integral mass.

5. The method of covering a preformed article with thermoplastic material comprising placing the article in a mold cavity so that the surface of the article lies in spaced relation to the cavity walls, and a portion of the space being relatively restricted at a predetermined zone, and the space in the remaining portion being greater, the temperature of the cavity wall adjacent the greater space being maintained at a degree sufficient to chill and partially set the material, injecting thermoplastic material in the plastic condition and under pressure into the greater space at a zone remote from the restricted portion, causing the material to first diverge and flow in the said space and subsequently to converge and meet in the relatively restricted portion and applying heat at the said restricted zone of greater temperature than the temperature in the said remaining portion.

6. An injection type mold for covering a preformed article with thermoplastic material comprising separable sections having recesses in the engaging faces defining a mold cavity when the sections are in closed positions, means for supporting the article in spaced relation from the cavity walls when the mold sections are closed, the temperature of the major portion of the cavity surface being maintained at a degree sufficient to chill and partially set the material as it contacts the said surface portion, gate means between the mold sections opening into the space between the article and the cavity walls for conducting thermoplastic material in the plastic state to the said space, said gate means being so positioned relative to the walls of the cavity as to cause said material to be divided into a number of streams, to fill that part of the said space adjacent the said major portion of the cavity surface, and, upon continued injection of the material, to subsequently induce the leading edges of two streams to unite in a predetermined minor portion of the said space, and heating means adjacent the said predetermined minor portion to maintain the temperature of the said minor portion at a degree sufficient to render the leading edges of the streams relatively more plastic than where in contact with said major surface portion of the cavity.

JAMES S. REID.